United States Patent
Driscoll

(10) Patent No.: US 11,570,268 B2
(45) Date of Patent: Jan. 31, 2023

(54) PROXY SYSTEM FOR BOT CONNECTIVITY TO COMMUNICATION CHANNELS

(71) Applicant: Microsoft Technology Licensing, LLC, Redmond, WA (US)

(72) Inventor: Daniel James Driscoll, Seattle, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 521 days.

(21) Appl. No.: 15/711,433

(22) Filed: Sep. 21, 2017

(65) Prior Publication Data

US 2019/0089798 A1  Mar. 21, 2019

(51) Int. Cl.
| | |
|---|---|
| H04L 67/56 | (2022.01) |
| H04L 51/02 | (2022.01) |
| H04L 69/24 | (2022.01) |
| H04L 67/01 | (2022.01) |
| H04L 67/565 | (2022.01) |

(52) U.S. Cl.
CPC ........... *H04L 67/56* (2022.05); *H04L 51/02* (2013.01); *H04L 67/01* (2022.05); *H04L 67/565* (2022.05); *H04L 69/24* (2013.01)

(58) Field of Classification Search
CPC ......... H04L 67/28; H04L 67/42; H04L 51/02; H04L 69/24
See application file for complete search history.

(56) References Cited

U.S. PATENT DOCUMENTS

| | | | | |
|---|---|---|---|---|
| 2009/0006975 | A1* | 1/2009 | Salim | G06Q 10/10 715/738 |
| 2012/0324110 | A1* | 12/2012 | Kohli | H04L 63/0281 709/226 |
| 2014/0123237 | A1* | 5/2014 | Gaudet | H04L 63/08 726/4 |
| 2016/0301739 | A1* | 10/2016 | Thompson | G06F 9/541 |
| 2018/0129181 | A1* | 5/2018 | Kratzer, III | G05B 19/05 |
| 2018/0150524 | A1* | 5/2018 | Anger | H04L 51/02 |
| 2018/0337818 | A1* | 11/2018 | Ban | H04L 69/324 |

\* cited by examiner

*Primary Examiner* — Caroline H Jahnige

(57) ABSTRACT

A proxy apparatus acts as an intermediary between one or more bot apparatuses and one or more communication channels. The proxy apparatus connects a communication channel to a bot apparatus for the exchange of messages. A user can interact with the bot apparatus through the communication channel. The proxy apparatus is configured to perform one or more operations or services. Example operations include, but are not limited to, registration, authentication and authorization, the recordation of telemetry data, schema transformation, and identity transformation.

20 Claims, 10 Drawing Sheets

PROXY SYSTEM FOR BOT CONNECTIVITY TO COMMUNICATION CHANNELS

BACKGROUND

It is common for an entity, such as a company, to provide dedicated network communication channels for their customers, users, employees, and vendors. The customers, users, employees, and vendors can use the communication channels to access and interact with various applications on a network (e.g., the Internet). Some of these applications are bots that perform specific tasks, such as automated or repetitive tasks. Additionally, a bot can be an intelligent system that interacts with the users, employees, vendors, and customers over the network.

However, the number of bots that are available to the users, employees, and customers is increasing every day. It can be costly for a single entity to provide communication channels to the various bots. It can require a substantial amount of time to create and maintain a communication channel for each bot, which increases the cost of providing communication channels to the bots. Accordingly, many entities do not have a rich supply of bots to include in their dedicated communication channel. This is because their communication channel may not be compatible technically with the bots. Additionally, when a communication channel is technically compatible with a bot, the bot may not be included in a trusted marketplace, which can adversely impact the utilization of the bot.

It is with respect to these and other general considerations that embodiments have been described. Also, although relatively specific problems have been discussed, it should be understood that the embodiments should not be limited to solving the specific problems identified in the background.

SUMMARY

Embodiments disclosed herein provide a proxy apparatus that permits bot apparatuses to connect to arbitrary communication channels. The proxy apparatus acts as an intermediary between the bot apparatuses and the communication channels. The proxy apparatus connects a communication channel to a bot apparatus for the exchange of messages. The proxy apparatus acts as a trusted service even though the bot apparatus and the communication channel may not have a trust relationship. Additionally or alternatively, the proxy apparatus may provide a guarantee that a party (e.g., a bot apparatus or a communication channel) is authentic. A user can interact with the bot apparatus through the communication channel. The proxy apparatus is configured to perform one or more operations or services. Example operations include, but are not limited to, registration, authentication and authorization, the recordation of telemetry data, schema transformation, and identity transformation.

In a first aspect, a proxy apparatus for exchanging messages between a bot apparatus and a communication channel includes a registration apparatus, an authentication and authorization apparatus, and a telemetry apparatus. The registration apparatus receives registration information associated with the bot apparatus and the communication channel to register the bot apparatus and the communication channel with the proxy apparatus. The authentication and authorization apparatus authenticates the bot apparatus and the communication channel based on the registration information. The authentication and authorization apparatus also authorizes the exchange of messages between the bot apparatus and the communication channel. The telemetry apparatus creates a telemetry record for at least one message exchanged between the bot apparatus and the communication channel.

In another aspect, a method of operating a proxy apparatus includes reviewing, by the proxy apparatus, registration data associated with a communication channel to authenticate the communication channel and reviewing registration data associated with a bot apparatus to authenticate the bot apparatus in response to a received message. The proxy apparatus reviews information that links the authenticated bot apparatus with the authenticated communication channel to enable the bot apparatus and the communication channel to exchange one or more messages using the proxy apparatus. The proxy apparatus authorizes the exchange of the message based on the authentications of the bot apparatus and the communication channel and the information that links the bot apparatus with the communication channel.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following Figures. The elements of the drawings are not necessarily to scale relative to each other. Identical reference numerals have been used, where possible, to designate identical features that are common to the figures.

DETAILED DESCRIPTION

Figure 1:
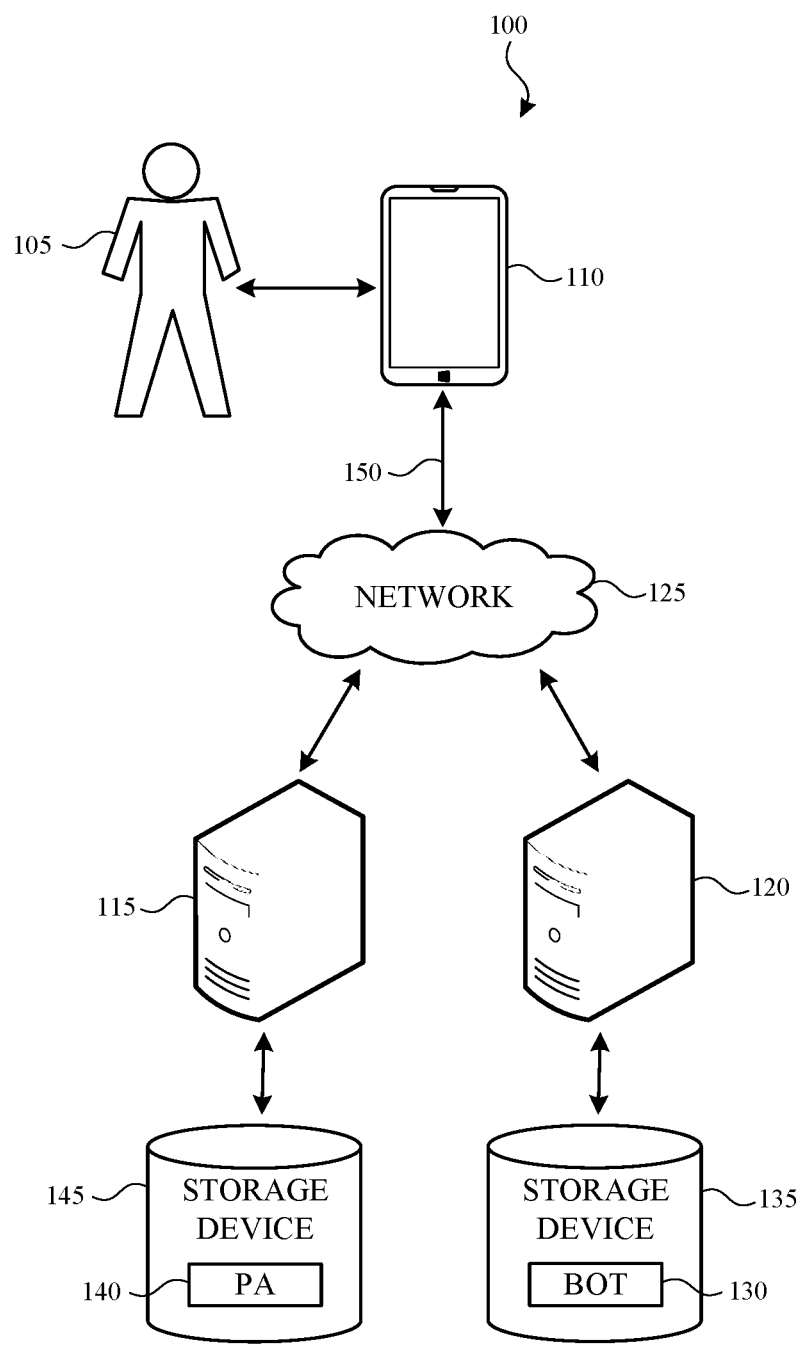
FIG. 1 illustrates an example system that can include a proxy apparatus.

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Embodiments may be practiced as methods, systems or devices. Accordingly, embodiments may take the form of a hardware implementation, an entirely software implementation, or an implementation combining software and hardware aspects. The following detailed description is therefore not to be taken in a limiting sense, and the scope of the present disclosure is defined by the appended claims and their equivalents.

Embodiments described herein provide a proxy apparatus that allows one or more bot apparatuses to connect to one or more communication channels to interact with a user. The proxy apparatus also permits the user to interact with the bot apparatus(es) through a communication channel. The proxy apparatus allows a bot apparatus and a communication channel to exchange messages without the bot apparatus having to know or have information about the communication channel, and vice versa. The proxy apparatus is an endpoint for the messages transmitted by the bot apparatus. Similarly, the proxy apparatus is an endpoint for the message transmitted by the communication channel.

The proxy apparatus allows bot apparatus developers to develop a bot apparatus for their system and to customize the bot apparatus to perform any number of desired or given operations. Similarly, the proxy apparatus permits communication channel developers to develop and customize a communication channel for their system. This freedom to develop and customize bot apparatuses and communication channels can increase the number of bot apparatuses and/or communication channels that are available to a user. Additionally or alternatively, the proxy apparatus can make it easier and more efficient to associate a bot apparatus with one or more channels, and vice versa.

Moreover, the proxy apparatus provides security isolation for the bot apparatuses and the communication channels. A bot apparatus and a communication channel can exchange messages without the requirement to have information about each other. The bot apparatus communicates with the proxy apparatus and does not have to know about a communication channel. Similarly, the communication channel communicates with the proxy apparatus and does not have to know about a bot apparatus. Additionally, the proxy apparatus can provide impedance matching across heterogeneous security domains to produce seamless (or substantially seamless) transportation of messages across the different security domains.

The term "apparatus" is intended to be construed broadly to include hardware (e.g., electronic circuits, electronic components, processing units, etc.), software that is executable by a processing unit or computing device, and combinations thereof. For example, in some embodiments, an "apparatus" includes one or more computer-executable programs that is stored on one or more storage devices and executed by one or more computing devices. Each computing device can be, for example, a client-computing device or a server-computing device.

FIG. 1 illustrates an example system that can include a proxy apparatus. The system 100 allows a user 105 to interface with one or more bot apparatuses through a client-computing device 110. In one embodiment, a bot apparatus performs a specific task, such as an automated or repetitive task. In another embodiment, a bot is an intelligent system that can interact with a user or other computing device. For example, a bot may be a personal or virtual assistant, such as Cortana® by Microsoft Corporation.

The client-computing device 110 is configured to access one or more server-computing devices (represented by server-computing devices 115, 120) through one or more networks (represented by network 125). In one or more embodiments, the network 125 is illustrative of any suitable type of network, for example, an intranet and/or a distributed computing network (e.g., the Internet) over which the user 105 may communicate with other users and with other computing systems.

A bot apparatus (BOT) 130 is stored on one or more storage devices (represented by storage device 135) and executed by the server-computing device 120. A proxy apparatus (PA) 140 is stored on one or more storage devices (represented by storage device 145) and executed by the server-computing device 115.

The client-computing device 110 is configured to access the server-computing devices 115, 120 through one or more communication channels (represented by communication channel 150) to interface with the proxy apparatus 140 and the bot apparatus 130. As will be described in more detail later, the proxy apparatus 140 allows the bot apparatus 130 to connect to the communication channel 150 to interact with the user 105, and permits the user to interact with the bot apparatus 130 through the communication channel 150. The proxy apparatus 140 allows the bot apparatus 130 and the communication channel 150 to exchange messages without the bot apparatus 130 having to know or have information about the communication channel 150, and vice versa. The proxy apparatus 140 is an endpoint for the messages transmitted by the bot apparatus 130. Similarly, the proxy apparatus 140 is an endpoint for the message transmitted by the communication channel 150.

The bot apparatus 130 and the communication channel 150 can be developed and maintained by the same entity or by separate entities. In general, the proxy apparatus 140 is developed and maintained by an entity that is separate from the entity or entities that develop and maintain the bot apparatus 130 and the proxy apparatus 140. In some instances, the entity that is responsible for the proxy apparatus 140 may also develop a bot apparatus and/or a communication channel that operate through the proxy apparatus 140.

In one or more embodiments, the client-computing device 110 is a personal or handheld computing device. For example, the client-computing device 110 may be one of: a mobile telephone; a smart phone; a tablet; a phablet; a smart watch; a wearable computer; a personal computer; a desktop computer; a laptop computer; a gaming device/computer (e.g., Xbox); a television; and the like. This list of example client-computing devices is for example purposes only and should not be considered as limiting. Any suitable client-computing device that interfaces with a bot apparatus may be utilized.

As should be appreciated, FIG. 1 is described for purposes of illustrating the present methods and systems and is not intended to limit the disclosure to a particular sequence of steps or a particular combination of hardware or software components.

Figure 2:
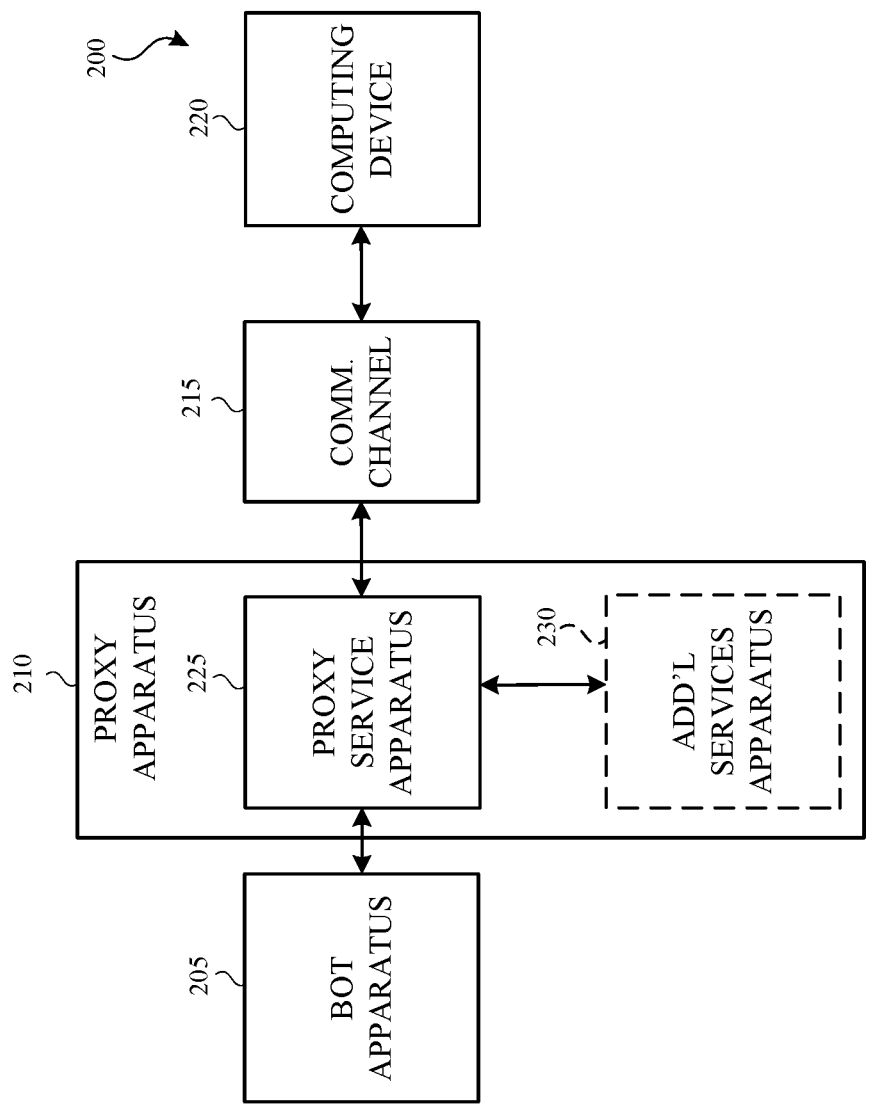
FIG. 2 is a block diagram depicting a process of operating a proxy apparatus.

FIG. 2 is a block diagram depicting a process of operating a proxy apparatus. The system 200 includes one or more bot apparatuses (represented by bot apparatus 205) operably connected to a proxy apparatus 210. The proxy apparatus 210 is operably connected to one or more communication channels (represented by comm. channel 215). One or more computing devices (represented by computing device 220) are operably connected to the communication channel 215. The one or more computing devices can be implemented as one or more server-computing devices, one or more client-computing devices, or combinations of server and client-computing devices.

The proxy apparatus 210 includes a proxy service apparatus 225 and one or more optional additional service apparatuses 230. The proxy service apparatus 225 is configured to act as an intermediary between the communication channel 215 and the bot apparatus 205. The proxy service apparatus 225 receives messages from the communication channel 215 that are associated with the one or more functions or actions of the bot apparatus 205. Similarly, the proxy service apparatus 225 receives messages from the bot apparatus 205 that are associated with interactions with the computing device 220 accessible through the communication channel 215.

The proxy service apparatus 225 communicates with the communication channel 215 and with the bot apparatus 205 using any suitable communication language, protocol, or file format. For example, in one embodiment the bot apparatus 205, the proxy apparatus 210, and the communication channel 215 transmit and receive messages using the JavaScript Object Notation (JSON) data-interchange format. However, a different communication language, protocol, or file format can be used in other embodiments. One example of another communication language, protocol, or file format is eXtensible Markup Language (XML).

The proxy service apparatus 225 provides security isolation to the system 200. The bot apparatus 205 communicates with the proxy service apparatus 225 and does not have to know about the communication channel 215. Similarly, the communication channel 215 communicates with the proxy service apparatus 225 and does not have to know about the bot apparatus 205. Additionally, the proxy service apparatus 225 can provide impedance matching across heterogeneous security domains to produce seamless (or substantially seamless) transportation of messages across the different security domains.

The optional one or more additional services apparatuses 230 provide operations or functions that enhance or support the operations of the proxy service apparatus 225. Example additional services apparatuses include, but are not limited, to the rendering of the content in a message into a more suitable format (e.g., transforming a word processing document into a Portable Document Format (PDF) document when the user can only accept PDF documents), the storage of the message for document retention and compliance operations, and the transformation of an abstract request (e.g., an invoice) into an actionable object (e.g., an invoice with a "pay" button) within the same format. In some instances, the transformation may be customized for the recipient of the message. A bot apparatus may not know the contents in a message should be customized for the recipient or the nature of those customizations, so the proxy apparatus can know and perform the necessary customizations for the bot apparatus.

Figure 3:
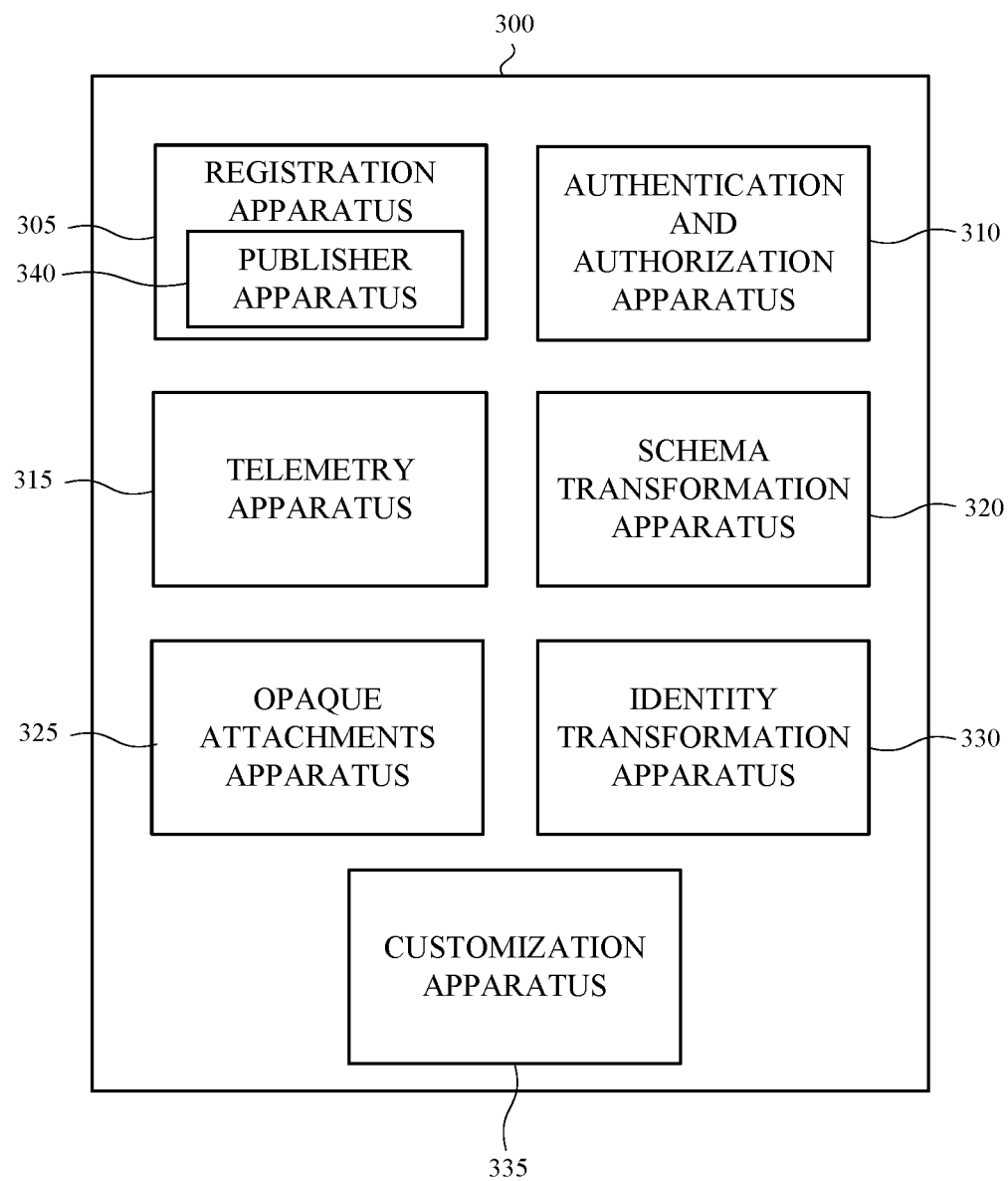
FIG. 3 is a block diagram illustrating example operations that may be performed by a proxy service apparatus.

FIG. 3 is a block diagram illustrating example operations that may be performed by a proxy service apparatus. The representative proxy service apparatus 300 includes a registration apparatus 305, an authentication and authorization apparatus 310, a telemetry apparatus 315, a schema transformation apparatus 320, an opaque attachment apparatus 325, an identity transformation apparatus 330, and a customization apparatus 335. Each of these apparatuses is described in more detail below.

The registration apparatus 305 can be used by developers of the communication channels to register the communication channels with the proxy service apparatus 300. In some instances, the registration apparatus 305 may be used by the developers of the bot apparatuses to register the bot apparatuses with the proxy service apparatus 300. Additionally or alternatively, the registration apparatus 305 may be used by the developers of the communication channels and/or the bot apparatuses to link a bot apparatus to one or more communication channels. In some embodiments, the developers of the bot apparatuses may also register the bot apparatus with a separate system. One example of a separate system is the Bot Framework by Microsoft Corporation.

The registration apparatus 305 may perform other operations, such as security and quality operations. For example, the registration apparatus 305 can perform operations such as accepting and publishing bot apparatuses, anti-fraud operations, editorial review operations, and/or accepting and publishing customer ratings and reviews. Accordingly, the registration apparatus 305 may include access control to grant administrators the ability to decide which bot apparatuses and communication channels are available. Alternatively, in some embodiments, the registration apparatus 305 can be completely self-service when approval by the owner of the proxy apparatus does not require approval.

The registration apparatus 305 can be implemented as any suitable process and/or system. For example, in one embodiment, a developer of a bot apparatus or a communication channel may send an electronic communication (e.g., an email message) to an administrator of the proxy apparatus requesting the registration of its bot apparatus or communication channel. In another embodiment, the registration apparatus 305 can be a website that the developer of the bot apparatus or the communication channel accesses and clicks on a registration link or button to register the bot apparatus or the communication channel. In some aspects, the proxy service apparatus 300 transmits secret data (e.g., a secret key) to the bot apparatus and the bot apparatus transmits secret data to the proxy service apparatus 300 when the bot apparatus registers with the proxy service apparatus 300. Similarly, the proxy service apparatus 300 and the communication channel exchange secret data (e.g., secret keys) the when the communication channel registers with the proxy service apparatus 300. The secret data can be used by the proxy service apparatus 300 to authenticate the bot apparatus and the communication channel.

In some embodiments, the registration apparatus 305 includes a publisher apparatus 340. The publisher apparatus 340 is configured to publish information or details about the proxy service apparatus 300, the bot apparatuses operably connected to the proxy service apparatus 300, and the communication channels operably connected to the proxy service apparatus 300. The publisher apparatus 340 is optional and may be omitted in other embodiments. Alternatively, the publisher apparatus 340 can be separate and distinct from the registration apparatus 305.

In some instances, the publisher apparatus 340 may include programs and/or information that is accessible by a user and/or by a computing device (e.g., a client or server-computing device). One example of user-accessible data is a bot apparatus store that a user can peruse to discover or access available bot apparatuses. One example of data that is accessible by a computing device is a bot manifest that may specify attributes, resources, and other data associated with, or access by a bot apparatus.

The authentication and authorization apparatus 310 is configured to authenticate a bot apparatus and a communication channel. If the bot apparatus is calling the proxy service apparatus 300 (e.g., transmits a message to the proxy service apparatus 300), the bot apparatus may authenticate itself as a bot apparatus. The authentication and authorization apparatus 310 reviews the registration information for a communication channel to confirm the communication channel is registered with the proxy service apparatus 300. The authentication and authorization apparatus 310 also reviews the registration information for a bot apparatus to confirm the bot apparatus is registered and approved (if approval is required) with the proxy service apparatus 300 and is associated or linked with a registered communication channel. Based on the authentication of the bot apparatus and the communication channel, and/or a review of information that links the bot apparatus to the communication channel, the authentication and authorization apparatus 310 authorizes the exchange of messages between the bot apparatus and the communication channel.

Any suitable authentication technique can be used by the authentication and authorization apparatus 310 to authenticate a bot apparatus and/or a communication channel. One example of an authentication technique is to require a party (e.g., a bot apparatus) to produce secret information (e.g., a secret key) or to provide proof that the party holds the secret information without actually sending that information to the authentication and authorization apparatus 310. The proof that the party holds the secret information can be provided via a public key infrastructure (PKI), by hashing the content in a message so that the authentication and authorization apparatus 310 can conclude the party has the required secret information, or by any other suitable method. Another example of an authentication technique is to require a party to produce a token or voucher from a third trusted service, where the token or voucher asserts the identity of the party. In another example, a party can be authenticated by establishing the source of the party's messages or traffic (e.g., an Internet Protocol (IP) address).

In some embodiments, the authentication and authorization apparatus 310 is configured to enforce the registration of a bot apparatus and a communication channel. Accordingly, if one party, such as a communication channel, does not want to receive messages from a particular bot apparatus, the authentication and authorization apparatus 310 will not authorize the transmission of messages from that bot apparatus to the communication channel.

The telemetry apparatus 315 is configured to create telemetry records or log telemetry data associated with the operations of the proxy service apparatus 300. For example, if a communication channel transmits a message to a bot apparatus, telemetry data regarding the message is logged into a telemetry record. Additionally or alternatively, if a communication channel transmits a message to a bot apparatus that results in an error, telemetry data regarding the message and the error may be recorded in a telemetry record. In some instances, the recorded or logged telemetry data can be used to debug the proxy apparatus (e.g., proxy apparatus 210 in FIG. 2).

The schema transformation apparatus 320 is configured to transform the messages (e.g., some or all of the content in a message) from one format to a different format. Generally, the transformed content is semantically identical but syntactically different from the original content. The transformation of a message can allow the message to be transported over different security domains. Additionally or alternatively, in some embodiments, the transformation can be performed based on revisions or updates to the proxy service apparatus 300. The transformation allows bot apparatuses and communication channels that are created after a change in the proxy service apparatus 300 to interface and exchange messages with bot apparatuses and communication channels that existed prior to the change in the proxy service apparatus 300. Alternatively, for security or compliance reasons, the message can itself be obscured such that the proxy service apparatus 300 is unaware of the shape or content in the message. In such embodiments, the proxy service apparatus 300 may be unable to perform some schema transformation operations. However, the proxy service apparatus 300 can still allow the bot apparatus and the communication channel to send sensitive content without the risk of disclosure to the proxy service apparatus 300 by obscuring some or most of the content in the message. A reduced or minimal amount of information can be available to the proxy service apparatus 300 to establish the authenticity of the sending party and the identity of the receiving party.

The opaque attachments apparatus 325 is configured to operate on messages that include attachments that have formats that are non-binary formats or have formats that are unknown to the proxy service apparatus 300. Example types of attachments that may have non-binary formats can include images, word processing documents, HyperText Markup Language (html) documents, and Portable Document Format (PDF) documents. The opaque attachments apparatus 325 can include one or more protocols that allow the opaque attachments to be exchanged between bot apparatuses and communication channels.

The identity transformation apparatus 330 is configured to modify identifying information on messages that are sent to or from the proxy service apparatus 300. For example, in some instances, particular identifying information may not be provided to a bot apparatus in order to prevent the bot apparatus from directly contacting one or more users. The identifying information can be obscured, deleted, replaced, and/or altered by the identity transformation apparatus 330 so that the identifying information is unavailable and/or unusable by the receiving party.

The customization apparatus 335 is configured to alter the contents in a message in ways that are unknown to a bot apparatus and a communication channel but that are known to the proxy service apparatus 300. The customization apparatus 335 is distinct from the identity transformation apparatus 330 because the identity transformation apparatus 330 obscures or replaces the identity so the source is not known, whereas the customization apparatus 335 adds to or enhances the message contents (e.g., because the identity is not fully known in advance). For example, the proxy service apparatus 300 may know a user's name and identification (ID), but a bot apparatus may only know the user's ID. The customization apparatus 335 can customize the message content and replace "{{username}}" within the message with the user's actual name, which is unknown to the bot apparatus. In another example, the proxy service apparatus 300 may detect a proposed meeting time ("10 am Tuesday") in a message and insert a red or green dot into the message based on whether the time is free on the recipient's calendar. This customization can be performed when the recipient's calendar or availability is known by the proxy service apparatus 300 but not by a bot apparatus.

Embodiments are not limited to the apparatuses illustrated in FIG. 3. Other embodiments can modify one or more apparatuses, omit one or more apparatuses from the proxy service apparatus 300, or add one or more apparatuses to the proxy service apparatus 300.

Figure 4:
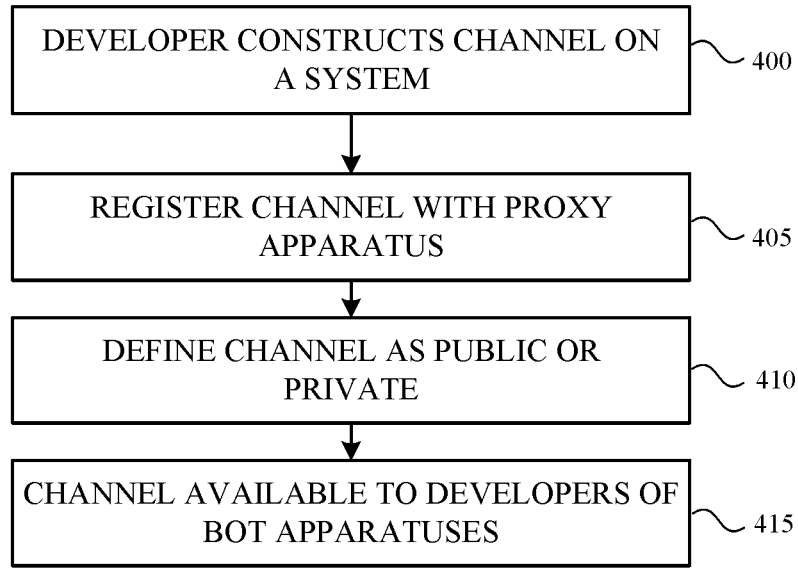
FIG. 4 is a flowchart depicting a method of creating a communication channel that is suitable for use with a proxy apparatus.

Non-limiting example operations of a proxy apparatus are now described. Those skilled in the art will recognize that other operations, or combinations of operations, can be performed by a proxy apparatus. FIG. 4 is a flowchart depicting a method of creating a communication channel that is suitable for use with a proxy apparatus. Initially, as shown in block 400, a developer constructs or creates a communication channel on a system that is accessible by computing devices (e.g., client and server-computing devices). In some embodiments, during construction of the communication channel the developer implements one or more protocols for the communication channel, such as, for example, a security protocol and a protocol that is associated with the proxy apparatus.

Next, as shown in block 405, the developer registers the communication channel with the proxy apparatus. The registration can be performed as described earlier or another registration process may be used. During or after registration, the developer can define or specify that the communication channel is a public communication channel that is available to the public or is a private communication channel that is accessible by a select number of users (block 410). For example, a communication channel may be created for a department in a company, such as the human resources department. Accordingly, the company may want the communication channel to be accessible only by the employees of the company. In such embodiments, the channel developer can specify to the proxy apparatus that the communication channel is a private communication channel.

Alternatively, in another example, a social media company can create a communication channel that is associated with an application and that is accessible by the public. In such embodiments, the channel developer can characterize the communication channel as a public communication channel with the proxy apparatus.

Next, as shown in block 415, the communication channel is made available to one or more developers of bot apparatuses. The communication channel can be made available using a number of different processes. Which process is used can be based on the type of communication channel (e.g., private or public), the types of bot apparatuses that may use the communication channel, and/or the developers of the bot apparatuses. For example, if a communication channel is a public communication channel, the communication channel can be published and released on a developer website or portal. Additionally or alternatively, information about the communication channel may be transmitted to potential bot apparatus developers through any suitable communication application or website.

If a communication channel is a private communication channel, the communication channel and/or information about the communication channel may only be distributed to developers that create bot apparatuses that will be associated with the private communication channel. For example, information about a communication channel that will only be used by the employees of a company can be distributed to bot apparatus developers within that company.

In some embodiments, a communication channel developer and a bot apparatus developer are the same person or entity. In such embodiments, the newly developed communication channel, or information about the communication channel, does not need to published or released to that bot developer since the two developers are the same person or entity. However, if the communication channel is to be accessible by other bot apparatus developers, the communication channel and/or information about the communication channel can be distributed to those bot developers using one of the previously described techniques.

Once the information about the communication channel is available to a bot apparatus developer, the bot apparatus developer can use that information to register and link the bot apparatus to the communication channel. This can be done as part of the process of registering the bot apparatus with the proxy apparatus.

Figure 5:
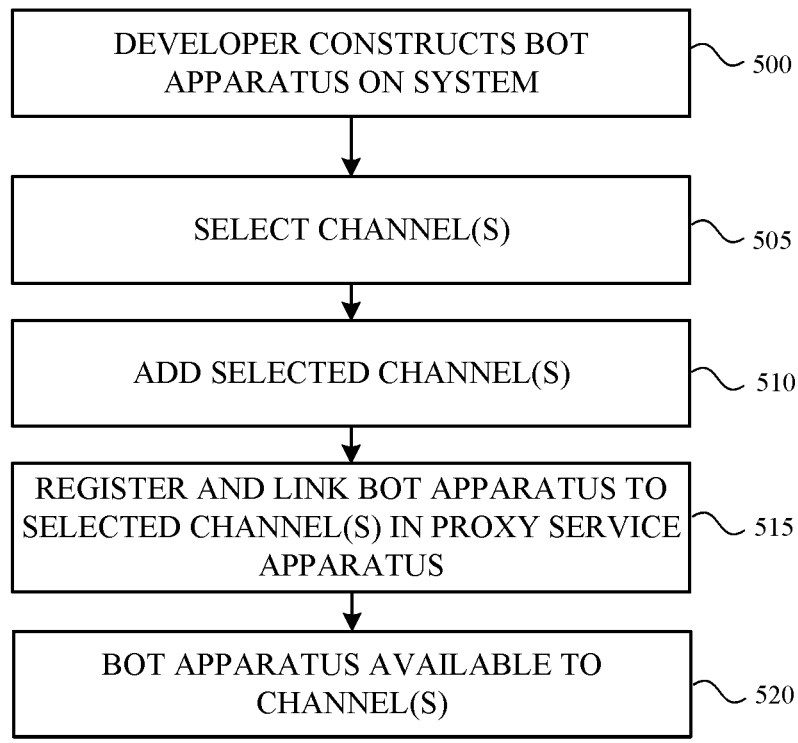
FIG. 5 is a flowchart illustrating a method of creating a bot apparatus that is suitable for use with a proxy apparatus.

FIG. 5 is a flowchart illustrating a method of creating a bot apparatus that is suitable for use with a proxy apparatus. Initially, as shown in block 500, a developer constructs or creates a bot apparatus on a system. The bot apparatus developer can then select one or more communication channels to be associated with and to exchange messages (block 505). At block 510, the selected communication channel(s) are added to the registration information for the bot apparatus. Next, as shown in block 515, the selected communication channel(s) are linked to the bot apparatus. The bot apparatus is then available to the linked communication channel(s).

The process of adding the selected communication channel(s) at block 510 can include asking each selected communication channel to send a message with the configuration data for the communication channel. For example, a communication channel can send a JSON payload that is in the suitable format. Using details in the configuration data (e.g., API endpoints and routing information), the proxy apparatus can send messages from the bot apparatus to any communication channel.

Figure 6:
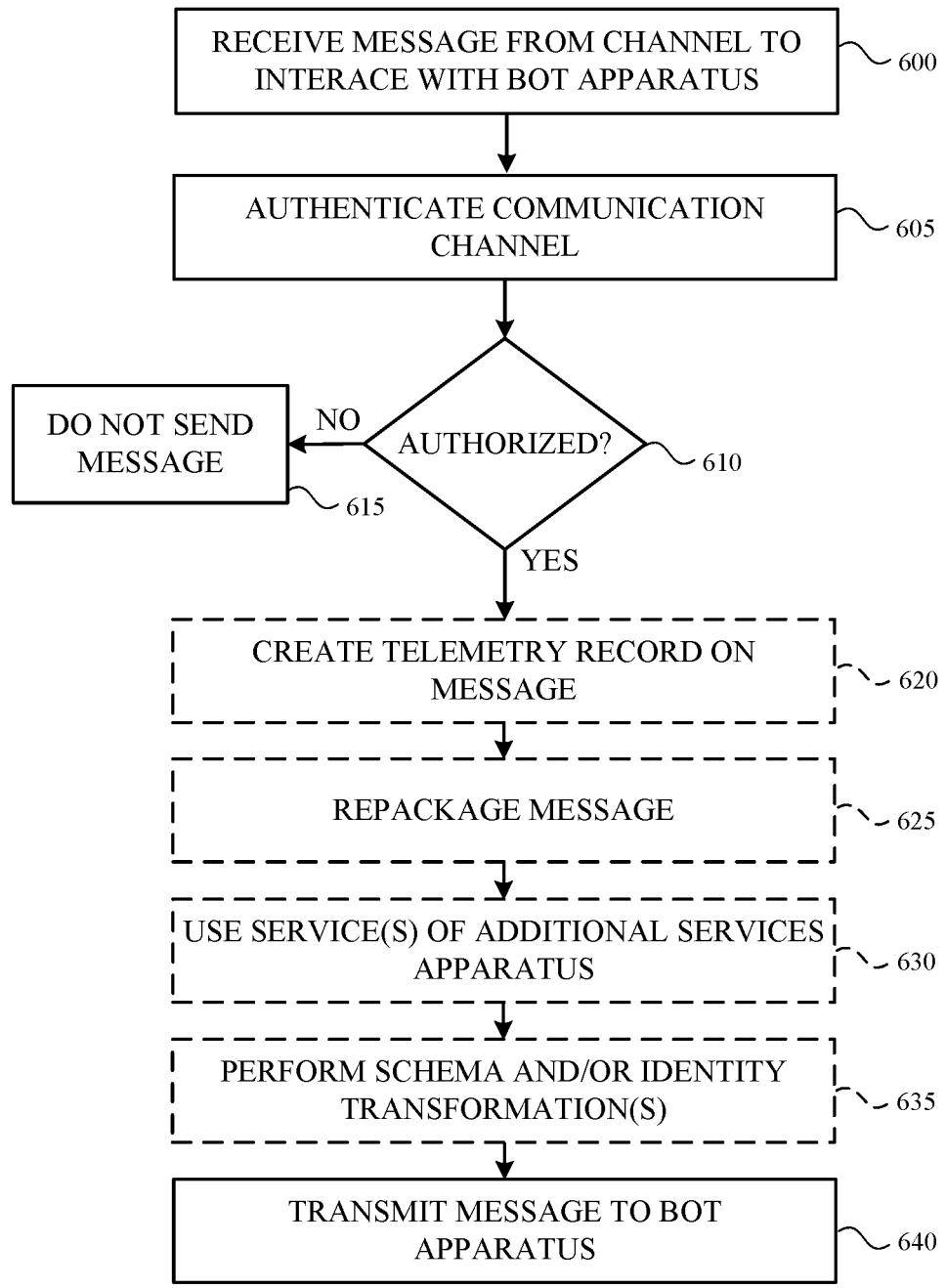
FIG. 6 is a flowchart depicting a method of operating a proxy apparatus based on a message to interface with a bot apparatus.

FIG. 6 is a flowchart depicting a method of operating a proxy apparatus based on a message to interface with a bot apparatus. Initially, as shown in block 600, a proxy apparatus receives a message from a communication channel. In response to the receipt of the message, the proxy apparatus authenticates the communication channel (block 605). Based on a successful authentication, the proxy apparatus determines whether the transmission of the message is authorized (block 610). As part of the authorization process, the proxy apparatus determines if the communication channel and the bot apparatus that is to receive the message are registered with the proxy apparatus and the bot apparatus is linked or associated with the communication channel.

If the authorization is not successful, the process passes to block 615 where the message is not sent. In some embodiments, the proxy apparatus may send an error to the user (via the communication channel) regarding the non-transmission of the message. Additionally or alternatively, the proxy service apparatus can create a telemetry record regarding the non-transmission of the message.

If the authorization is successful, the method continues at block 620 where the proxy apparatus may record or log telemetry data associated with the message in a telemetry record. The proxy apparatus can repackage the message at block 625. In one embodiment, the security domain of the message is changed to indicate the message is a communication between the proxy apparatus and the bot apparatus. The security domain may be changed because the bot apparatus is configured to recognize messages received from the proxy apparatus. The bot apparatus is not aware and may not recognize messages from the communication channel.

Optionally, the proxy apparatus can use or call one or more of the additional service apparatuses at block 630. Blocks 620, 625, and 630 are optional and one or more of the blocks can be omitted in other embodiments.

The proxy apparatus may perform schema and/or identity transformation(s) at block 635. As discussed earlier, the schema transformation converts the format of the message into a different format, while the identity transformation obscures or modifies identifying information that is included in the message so the identifying information is unavailable to, or usable by, the bot apparatus. The proxy apparatus then transmits the message to the bot apparatus (block 640). Like blocks 620, 625, 630, one or both operations in block 635 are optional and one or both operations may be omitted in other embodiments.

Figure 7:
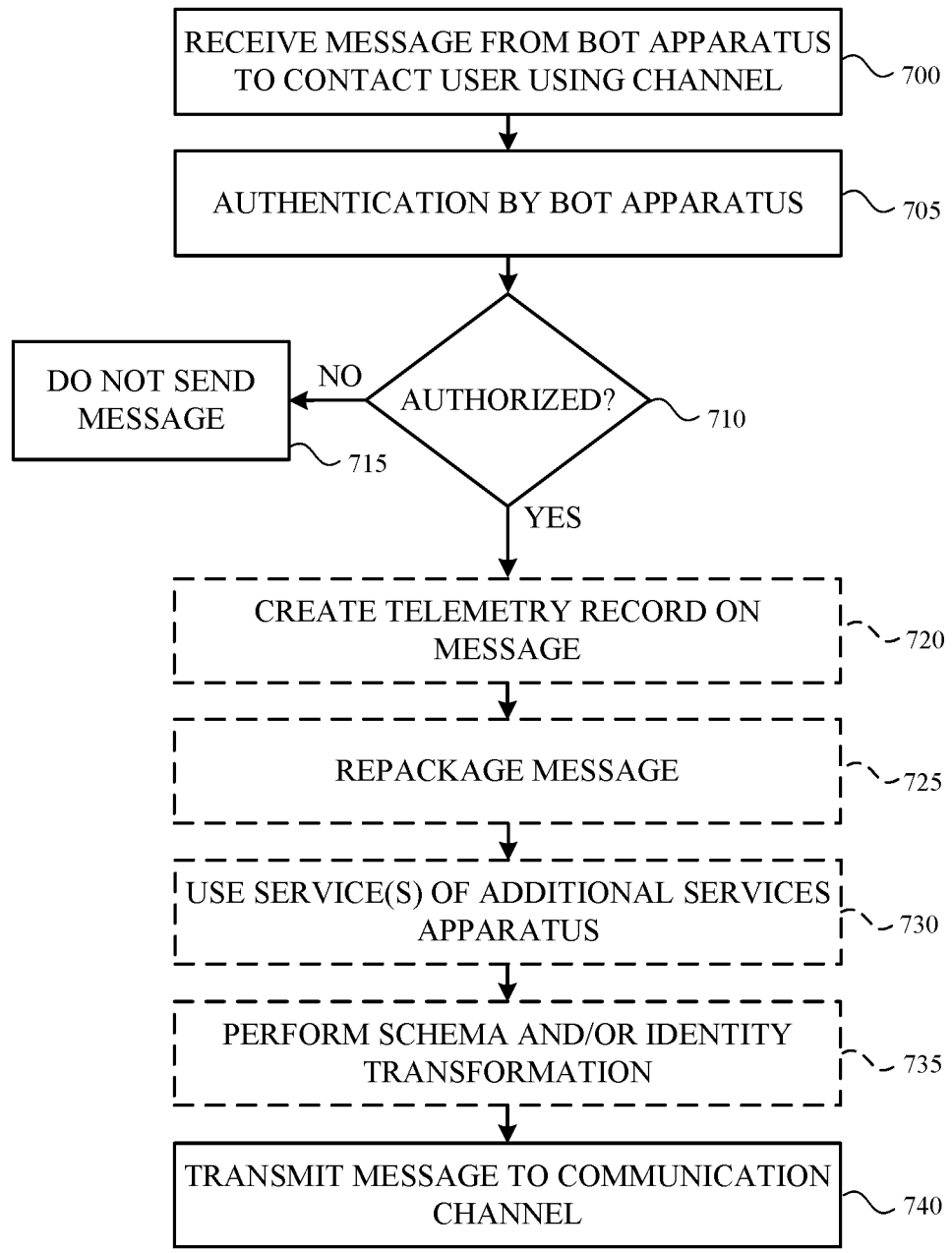
FIG. 7 is a flowchart illustrating a method of operating a proxy apparatus based on a message to interface with a communication channel.

FIG. 7 is a flowchart illustrating a method of operating a proxy apparatus based on a message to interface with a communication channel. Initially, as shown in block 700, a proxy service apparatus receives a message from a bot apparatus. In response to the receipt of the message, the bot apparatus authenticates itself with the proxy service apparatus (block 705). In one embodiment, the bot apparatus provides self-authenticating information in the message that is received at block 700.

Based on a successful authentication, the proxy apparatus determines whether the transmission of the message is authorized (block 710). As part of the authorization process, the proxy apparatus confirms the bot apparatus and the communication channel that is to receive the message are registered with the proxy apparatus and that the bot apparatus is linked or associated with the communication channel.

If the authorization is not successful, the process passes to block 715 where the message is not sent. In some embodiments, the proxy service apparatus may send an error to the bot apparatus regarding the non-transmission of the message. Additionally or alternatively, the proxy service apparatus can create a telemetry record regarding the non-transmission of the message.

If the authorization is successful, the method continues at block 720 where the proxy service apparatus may record or log telemetry data associated with the message in a telemetry record. The proxy service apparatus can repackage the message at block 725. In one embodiment, the security domain of the message is changed to indicate the message is a communication between the proxy apparatus and the communication channel. The security domain may be changed because the communication channel is configured to recognize messages received from the proxy apparatus. The communication channel is not aware and may not recognize messages from the bot apparatus.

Optionally, the proxy service apparatus uses one or more of the additional service apparatuses at block 730. Blocks 720, 725, and 730 are optional and one or more of the blocks can be omitted in other embodiments.

The proxy apparatus may perform schema and/or identity transformation(s) at block 735. Like blocks 720, 725, 730, the performance of the schema transformation is optional and may be omitted in other embodiments. The proxy apparatus then transmits the message to the communication channel (block 740).

Embodiments are not limited to the operations and/or the sequence of operations that are illustrated in FIGS. 4-7. One or more operations may be modified or omitted or one or more new operations can be added in other embodiments. Additionally or alternatively, the operations shown in one of the illustrated embodiments can be used in another illustrated embodiment. In some implementations, the operations depicted in two illustrated embodiments may be combined into a new embodiment. For example, in one instance, a proxy apparatus can receive a message from one party (e.g., a bot apparatus (block 700) or a communication channel (block 600)). In response to the received message, the proxy apparatus determines if the bot apparatus and the communication channel can be authenticated (blocks 605, 705) and if the transmission of the message is authorized to enable the exchange of the message (blocks 610, 710). The authentication and authorization process can include the proxy apparatus reviewing the registration data associated with the communication channel and the registration data associated with the bot apparatus. The proxy apparatus may also determine that the bot apparatus is linked to the communication channel. If the communication channel and the bot apparatus are authenticated and the transmission of the message is authorized, the proxy apparatus transmits the message to the other party (e.g., the communication channel or the bot apparatus) (blocks 640, 740). Prior to transmitting the message to the other party, the proxy apparatus may perform one or more of the optional operations depicted in blocks 620, 625, 630, 635, 720, 725, 730, 735.

In some instances, the proxy apparatus can assert its identity to the bot apparatus and the communication channel to allow the bot apparatus and the proxy channel to trust the proxy service. The proxy apparatus can use any suitable technique to assert its identity when a message is sent or received or when the bot apparatus or the communication channel want to confirm that the proxy apparatus is authentic. For example, the proxy apparatus can assert its identity by being on a trusted hostname (e.g., proxychannel.microsoft.com), by having pre-configured credentials, or by piggybacking on a pre-existing trust relationship. One method for a proxy apparatus to have pre-configured credentials is for the proxy apparatus to store a list of trusted keys. Additionally, one technique in which a proxy apparatus can piggyback on a pre-existing trust relationship is for the proxy apparatus to be pre-trusted by an application that is installed on a computing device (e.g., a client-computing device).

Figure 8:
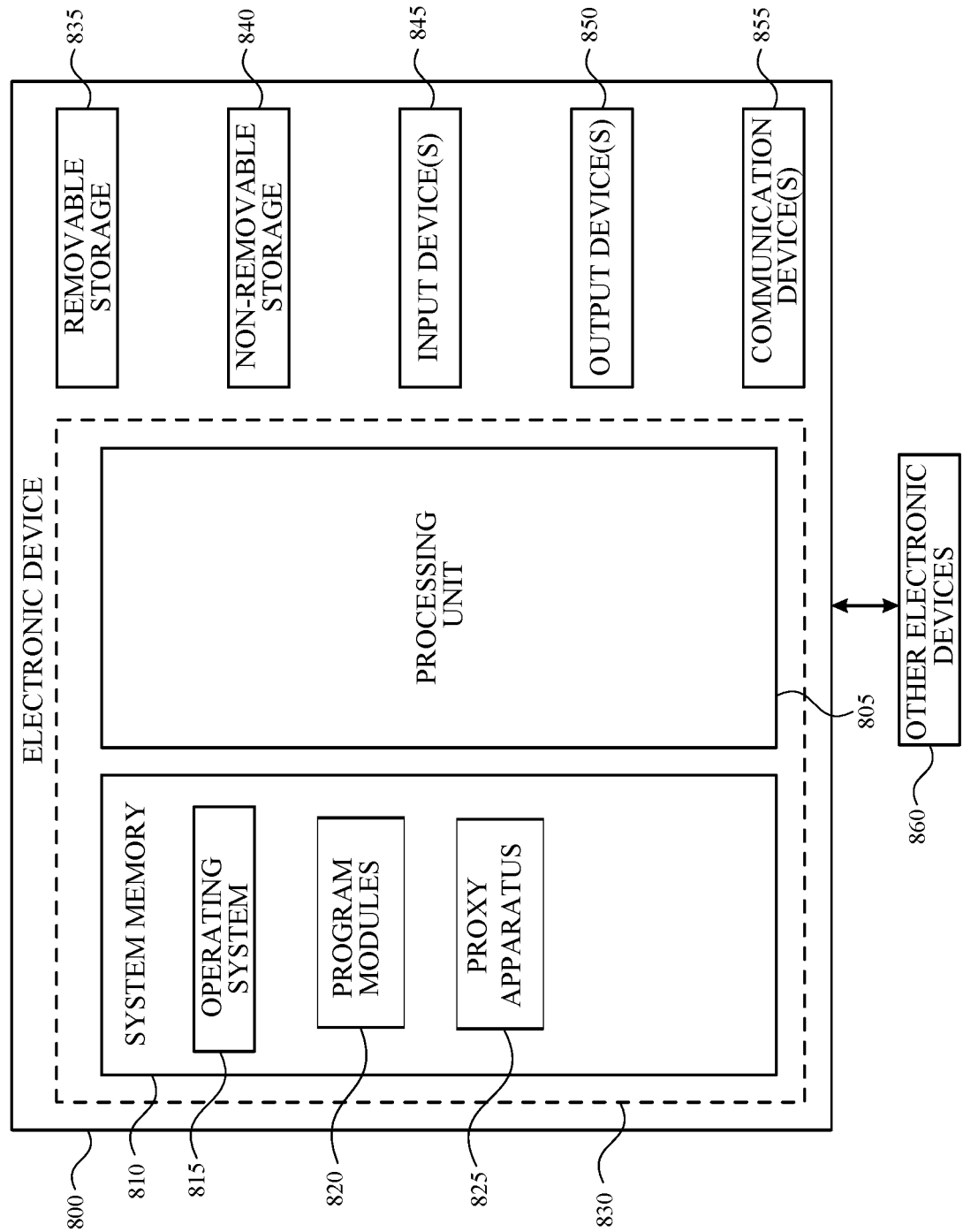
FIG. 8 is a block diagram depicting example physical components of a computing device with which aspects of the disclosure may be practiced.
Figure 9A:
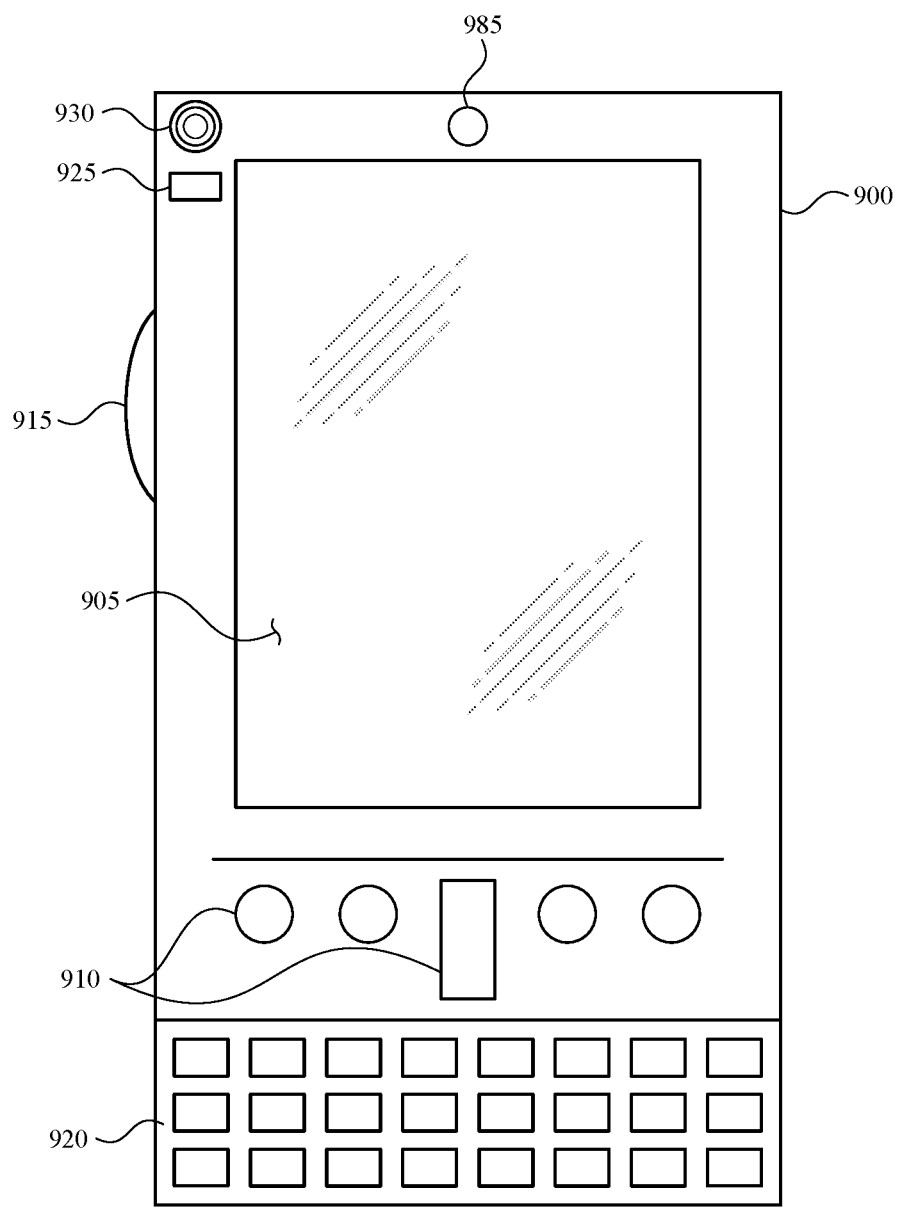
FIGS. 9A-9B are simplified block diagrams illustrating a mobile electronic device with which aspects of the present disclosure may be practiced.
Figure 9B:
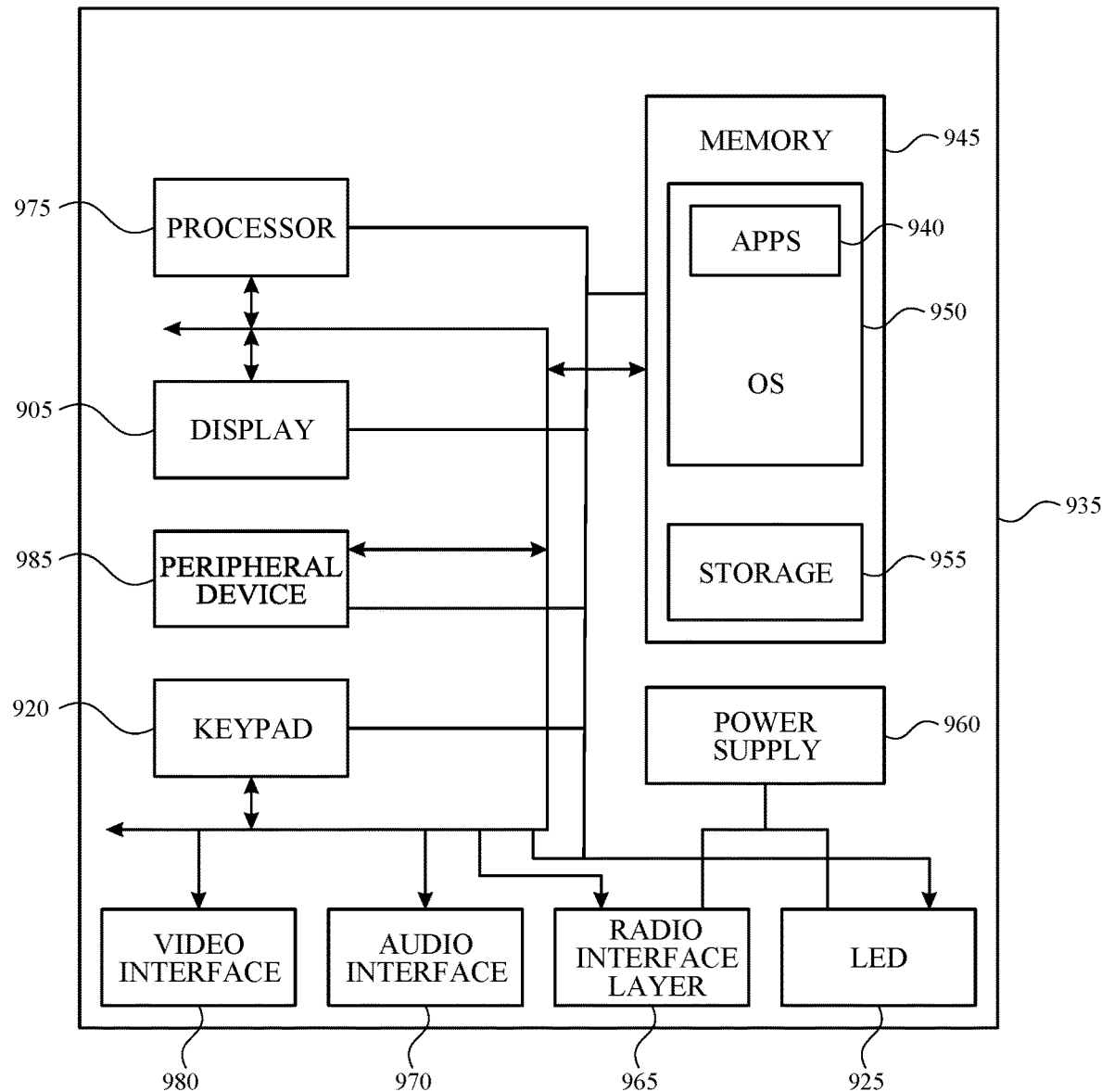
Figure 10:
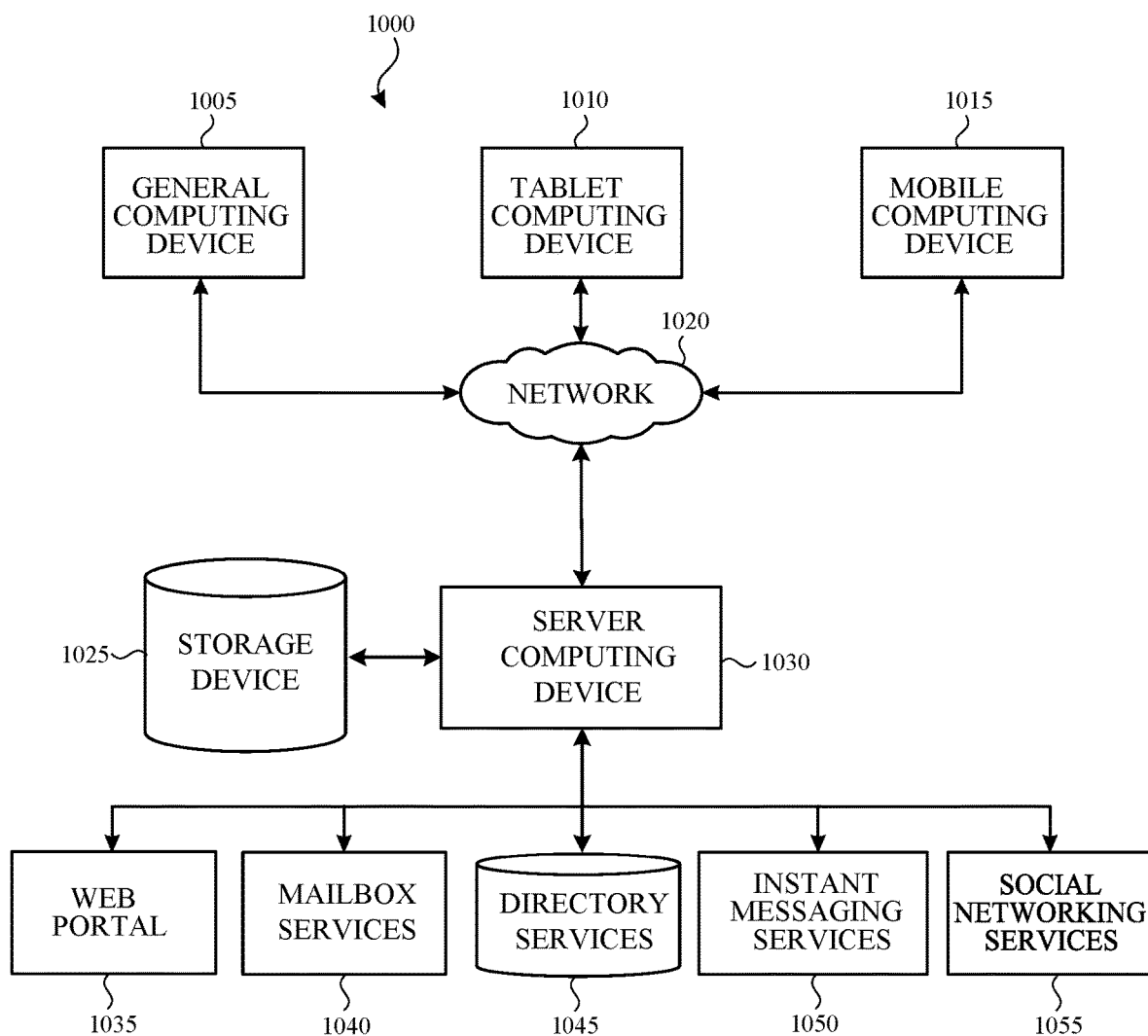
FIG. 10 is a block diagram of a distributed computing system in which aspects of the present disclosure may be practiced.

FIGS. 8-10 and the associated descriptions provide a discussion of a variety of operating environments in which aspects of the disclosure may be practiced. However, the devices and systems illustrated and discussed with respect to FIGS. 7 and 8 are for purposes of example and illustration and are not limiting of a vast number of electronic device configurations that may be utilized for practicing aspects of the disclosure, as described herein.

FIG. 8 is a block diagram illustrating physical components (e.g., hardware) of an electronic device 800 with which aspects of the disclosure may be practiced. The components described below may be suitable for the computing devices described above, including the client-computing device 110 and/or the server-computing devices 115, 120 in FIG. 1.

In a basic configuration, the electronic device 800 may include at least one processing unit 805 and a system memory 810. Depending on the configuration and type of the electronic device, the system memory 810 may comprise, but is not limited to, volatile storage (e.g., random access memory), non-volatile storage (e.g., read-only memory), flash memory, or any combination of such memories. The system memory 810 may include a number of program modules and data files, such as an operating system 815, one or more program modules 820 suitable for parsing received input, determining subject matter of received input, determining actions associated with the input and so on, and a proxy apparatus 825. While executing on the processing unit 805, the proxy apparatus 825 may perform and/or cause to be performed processes including, but not limited to, the aspects as described herein.

The operating system 815, for example, may be suitable for controlling the operation of the electronic device 800. Furthermore, embodiments of the disclosure may be practiced in conjunction with a graphics library, other operating systems, or any other application program and is not limited to any particular application or system. This basic configuration is illustrated in FIG. 8 by those components within a dashed line 830.

The electronic device 800 may have additional features or functionality. For example, the electronic device 800 may also include additional data storage devices (removable and/or non-removable) such as, for example, magnetic disks, optical disks, or tape. Such additional storage is illustrated in FIG. 8 by a removable storage device 835 and a non-removable storage device 840.

The electronic device 800 may also have one or more input device(s) 845 such as a keyboard, a trackpad, a mouse, a pen, a sound or voice input device, a touch, force and/or swipe input device, etc. The output device(s) 850 such as a display, speakers, a printer, etc. may also be included. The aforementioned devices are examples and others may be used. The electronic device 800 may include one or more communication devices 855 allowing communications with other electronic devices 860. In some instances, the communications with other electronic devices can occur using a communication channel that is associated with the proxy apparatus 825. Examples of suitable communication devices 855 include, but are not limited to, radio frequency (RF) transmitter, receiver, and/or transceiver circuitry, a universal serial bus (USB), and/or parallel and/or serial ports.

The term computer-readable media as used herein may include computer storage media. Computer storage media may include volatile and nonvolatile, removable and non-removable media implemented in any method or technology for storage of information, such as computer readable instructions, data structures, or program modules.

The system memory 810, the removable storage device 835, and the non-removable storage device 840 are all computer storage media examples (e.g., memory storage or storage devices). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the electronic device 800. Any such computer storage media may be part of the electronic device 800. Computer storage media does not solely include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors.

FIGS. 9A-9B illustrate a mobile electronic device 900, for example, a mobile telephone, a smart phone, wearable computer (such as a smart watch), a tablet computer, a laptop computer, and the like, with which embodiments of the disclosure may be practiced. With reference to FIG. 9A, one aspect of a mobile electronic device 900 for implementing the aspects is illustrated. The components described below may be suitable for the computing devices described above, including the client-computing device 110 in FIG. 1.

In a basic configuration, the mobile electronic device 900 is a handheld computer having both input elements and output elements. The mobile electronic device 900 typically includes a display 905 and one or more input buttons 910 that allow the user to enter information into the mobile electronic device 900. The display 905 of the mobile electronic device 900 may also function as an input device (e.g., a display that accepts touch and/or force input).

If included, an optional side input element 915 allows further user input. The side input element 915 may be a rotary switch, a button, or any other type of manual input element. In alternative aspects, mobile electronic device 900 may incorporate more or less input elements. For example, the display 905 may not be a touch screen in some embodiments. In yet another alternative embodiment, the mobile electronic device 900 is a portable phone system, such as a cellular phone. The mobile electronic device 900 may also include an optional keypad 920. Optional keypad 920 may be a physical keypad or a "soft" keypad generated on the touch screen display.

In various embodiments, the output elements include the display 905 for showing a graphical user interface (GUI) and a set of available templates, a visual indicator 925 (e.g., a light emitting diode), and/or an audio transducer 930 (e.g., a speaker). In some aspects, the mobile electronic device 900 incorporates a vibration transducer for providing the user with tactile feedback. In yet another aspect, the mobile electronic device 900 incorporates input and/or output ports, such as an audio input (e.g., a microphone jack), an audio output (e.g., a headphone jack), and a video output (e.g., a HDMI port) for sending signals to or receiving signals from an external device.

FIG. 9B is a block diagram illustrating the architecture of one aspect of a mobile electronic device 900. That is, the mobile electronic device 900 can incorporate a system (e.g., an architecture) 935 to implement some aspects. In one embodiment, the system 935 is implemented as a "smart phone" capable of running one or more applications (e.g., browser, e-mail, calendaring, contact managers, messaging clients, games, media clients/players, content selection and sharing applications and so on). In some aspects, the system 935 is integrated as an electronic device, such as an integrated personal digital assistant (PDA) and wireless phone.

One or more application programs 940 may be loaded into the memory 945 and run on or in association with the operating system 950. Examples of the application programs include phone dialer programs, e-mail programs, personal information management (PIM) programs, word processing programs, spreadsheet programs, Internet browser programs, messaging programs, and so forth.

The system 935 also includes a non-volatile storage area 955 within the memory 945. The non-volatile storage area 955 may be used to store persistent information that should not be lost if the system 935 is powered down.

The application programs 940 may use and store information in the non-volatile storage area 955, such as electronic communications, attachments or other messages used by an electronic communication application, images, audio, video, documents, and the like. A synchronization application (not shown) also resides on the system 935 and is programmed to interact with a corresponding synchronization application resident on a host computer to keep the information stored in the non-volatile storage area 955 synchronized with corresponding information stored at the host computer.

The system 935 has a power supply 960, which may be implemented as one or more batteries. The power supply 960 may further include an external power source, such as an AC adapter or a powered docking cradle that supplements or recharges the batteries.

The system 935 may also include a radio interface layer 965 that performs the function of transmitting and receiving radio frequency communications. The radio interface layer 965 facilitates wireless connectivity between the system 935 and the "outside world," via a communications carrier or service provider. Transmissions to and from the radio interface layer 965 are conducted under control of the operating system 950. In other words, communications received by the radio interface layer 965 may be disseminated to the application programs 940 via the operating system 950, and vice versa.

The visual indicator 925 may be used to provide visual notifications, and/or an audio interface 970 may be used for producing audible notifications via an audio transducer (e.g., audio transducer 930 illustrated in FIG. 9A). In the illustrated embodiment, the visual indicator 925 is a light emitting diode (LED) and the audio transducer 930 may be a speaker. These devices may be directly coupled to the power supply 960 so that when activated, they remain on for a duration dictated by the notification mechanism even though the processor 975 and other components might shut down for conserving battery power. The LED may be programmed to remain on indefinitely until the user takes action to indicate the powered-on status of the device.

The audio interface 970 is used to provide audible signals to and receive audible signals from the user (e.g., voice input such as described above). For example, in addition to being coupled to the audio transducer 930, the audio interface 970 may also be coupled to a microphone to receive audible input, such as to facilitate a telephone conversation. In accordance with embodiments of the present disclosure, the microphone may also serve as an audio sensor to facilitate control of notifications, as will be described below.

The system 935 may further include a video interface 980 that enables an operation of peripheral device 985 (e.g., on-board camera) to record still images, video stream, and the like.

A mobile electronic device 900 implementing the system 935 may have additional features or functionality. For example, the mobile electronic device 900 may also include additional data storage devices (removable and/or non-removable) such as, magnetic disks, optical disks, or tape. Such additional storage is illustrated in FIG. 9B by the non-volatile storage area 955.

FIG. 10 is a block diagram illustrating a distributed system in which aspects of the disclosure may be practiced. The system 1000 allows a user and a bot apparatus to interface or interact through a general computing device 1005 (e.g., a desktop computer), a tablet computing device 1010, and/or a mobile computing device 1015. The general computing device 1005, the tablet computing device 1010, and the mobile computing device 1015 can each include the components shown in the electronic device 800 of FIG. 8 or the mobile computing device 900 of FIG. 9.

The general computing device 1005, the tablet computing device 1010, and the mobile computing device 1015 are each configured to access one or more networks (represented by network 1020) using one or more communication channels. The general computing device 1005, the tablet computing device 1010, and the mobile computing device 1015 may interact with one or more storage devices (represented by storage device 1025) through one or more server-computing devices (represented by server-computing device 1030). The storage device 1025 can include the programs or systems shown in the storage device 135 and/or 145 of FIG. 1.

In some aspects, the server-computing device 1030 can access and/or receive various types of data from other sources, such as a web portal 1035, mailbox services 1040, a directory service 1045, instant messaging services 1050, and/or social networking services 1055. The web portal 1035, the mailbox services 1040, the directory service 1045, the instant messaging services 1050, and/or the social networking services 1055 can include one or more bot apparatuses. In some instances, these sources may provide robust reporting, analytics, data compilation and/or storage service, etc., whereas other services may provide search engines or other access to data and information, images, videos, document processing and the like.

As should be appreciated, FIGS. 8-10 are described for purposes of illustrating the present methods and systems and is not intended to limit the disclosure to a particular sequence of steps or a particular combination of hardware or software components.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

The invention claimed is:

1. A proxy apparatus for exchanging messages between a bot apparatus and a communication channel, the proxy apparatus comprising:
  a processor; and
  memory storing instructions, that when executed by the processor, cause the proxy apparatus to:
    receive first registration information associated with the communication channel to register the communication channel with the proxy apparatus;
    receive second registration information associated with the bot apparatus to register the bot apparatus with the proxy apparatus, wherein the second registration information links the bot apparatus with the communication channel;

based on the first and the second registration information, authenticate the bot apparatus and the communication channel; and based on the authentications of the bot apparatus and the communication channel, authorize the exchange of messages between the bot apparatus and the communication channel to enable the bot apparatus and a computing device to interact with each other over the communication channel.

2. The proxy apparatus of claim 1, wherein the memory stores further instructions to transform a received message from a first format to a different second format.

3. The proxy apparatus of claim 1, wherein the memory stores further instructions for altering identifying information in a received message.

4. The proxy apparatus of claim 1, wherein the memory stores further instructions for processing an attachment in a message, where the attachment has a non-binary format.

5. The proxy apparatus of claim 1, wherein the communication channel comprises a public communication channel.

6. The proxy apparatus of claim 1, wherein the communication channel comprises a private communication channel.

7. The proxy apparatus of claim 1, wherein the memory stores further instructions for alternating content in at least one message.

8. The proxy apparatus of claim 1, wherein the memory stores further instructions for publishing information about at least one of the bot apparatus or the communication channel.

9. The proxy apparatus of claim 1, wherein the memory stores further instructions for at least one of:

rendering content in a received message into a particular format;

creating a telemetry record for at least one message exchanged between the bot apparatus and the computing device;

storing a received message according to document retention and compliance operations;

or transforming a received message into an actionable object.

10. A method of operating a proxy apparatus, the method comprising:

in response to a received message, reviewing, by the proxy apparatus:

first registration data associated with a communication channel to authenticate the communication channel;

second registration data associated with a bot apparatus to authenticate the bot apparatus; and information that links the authenticated bot apparatus with the authenticated communication channel to enable the bot apparatus to connect to the communication channel; and based on the information that links the bot apparatus with the communication channel and the authentications of the bot apparatus and the communication channel, authorizing, by the proxy apparatus, a connection between the bot apparatus and the communication channel to enable the exchange, over the communication channel, of the received message between the bot apparatus and a computing device.

11. The method of claim 10, further comprising receiving, by the proxy apparatus, information that specifies the communication channel as a private or a public communication channel.

12. The method of claim 10, further comprising performing, by the proxy apparatus, a schema transformation operation on the received message, the schema transformation operation converting a format of the received message from a first format to a different second format.

13. The method of claim 10, further comprising performing, by the proxy apparatus, an identity transformation operation on the received message, the identity transformation operation altering identifying information in the received message.

14. The method of claim 10, further comprising creating, by the proxy apparatus, a telemetry record for the received message.

15. The method of claim 10, further comprising repackaging, by the proxy apparatus, the received message prior to transmitting the repackaged message.

16. The method of claim 15, wherein the operation of repacking the received message comprises changing a security domain associated with the received message.

17. The method of claim 10, further comprising processing, by the proxy apparatus, an opaque attachment attached to the received message to permit the proxy apparatus to transmit the received message and the opaque attachment.

18. The method of claim 10, further comprising not authorizing the exchange of the received message when the proxy apparatus is unable to authorize the bot apparatus or the communication channel.

19. The method of claim 10, further comprising not authorizing the exchange of the received message when the bot apparatus is not linked to the communication channel.

20. The method of claim 10, further comprising asserting, by the proxy apparatus, an identity of the proxy apparatus to the bot apparatus and to the communication channel.

* * * * *